Figure 1:
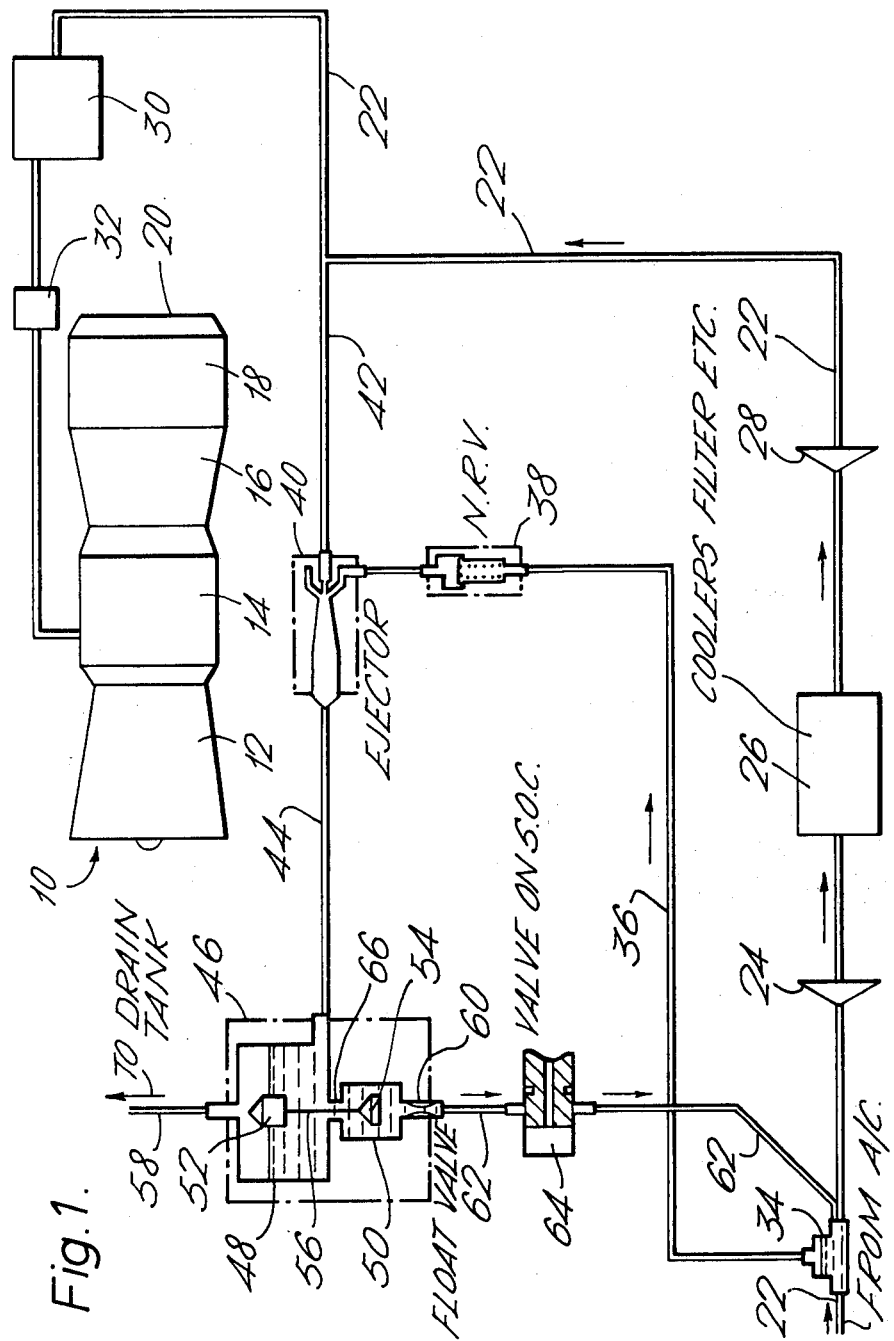

United States Patent [19]

Johnson et al.

[11] 4,066,386

[45] Jan. 3, 1978

[54] PRIMING SYSTEMS FOR PUMPS

[75] Inventors: Christopher Linley Johnson, Hartshorne, near Burton-on-Trent; Colin Millns, Denby Village, both of England

[73] Assignee: Rolls-Royce Limited, London, England

[21] Appl. No.: 716,798

[22] Filed: Aug. 23, 1976

[30] Foreign Application Priority Data

Sept. 6, 1975 United Kingdom ............... 36784/75

[51] Int. Cl.² .............................................. F04B 23/14
[52] U.S. Cl. ........................... 417/199 A; 60/39.09 F; 417/245; 417/405; 417/435
[58] Field of Search ....................... 417/79, 80, 87, 89, 417/77, 199 A, 201, 202, 279, 435, 175

[56] References Cited
U.S. PATENT DOCUMENTS

| 2,318,251 | 5/1943 | Moore | 417/199 A |
|---|---|---|---|
| 2,795,873 | 6/1957 | Hoffman | 417/199 A |
| 2,812,715 | 11/1957 | Redding et al. | 417/80 X |
| 3,584,979 | 6/1971 | Jarrett | 417/89 |
| 3,785,750 | 1/1974 | Bryant | 417/279 X |
| 3,811,797 | 5/1974 | Lewis | 417/202 X |

FOREIGN PATENT DOCUMENTS

| 527,764 | 6/1931 | Germany | 417/89 |
|---|---|---|---|
| 530,119 | 7/1931 | Germany | 417/89 |
| 697,786 | 10/1940 | Germany | 417/199 A |
| 1,110,187 | 7/1961 | Germany | 417/77 |

Primary Examiner—William L. Freeh
Assistant Examiner—Edward Look
Attorney, Agent, or Firm—Cushman, Darby & Cushman

[57] ABSTRACT

A reservoir is provided in the inlet line to a pump in which air and vapor collects. The air and vapor is drawn out by a fuel operated pump and supplied to a fuel/air separator. Fuel passes back to the inlet line and the air and vapor is allowed to escape.

11 Claims, 2 Drawing Figures

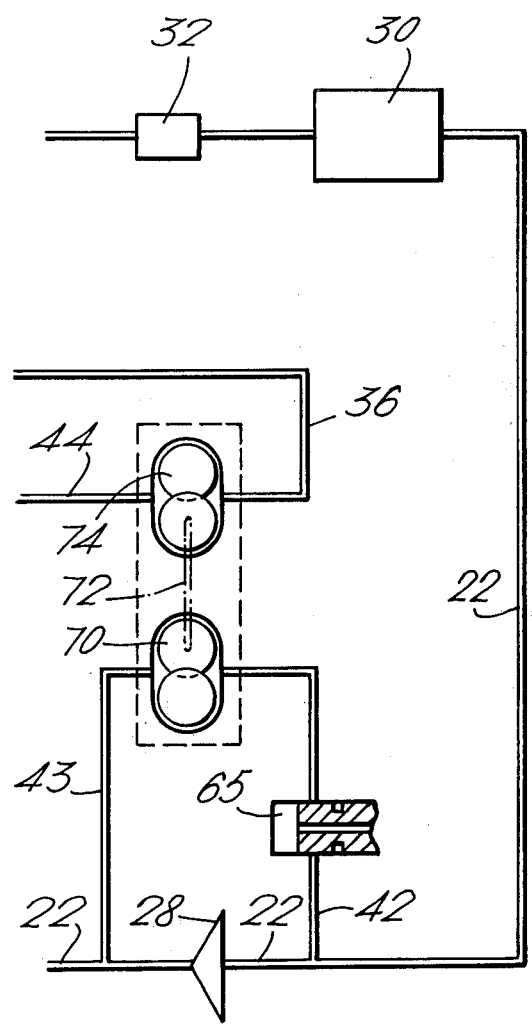

PRIMING SYSTEMS FOR PUMPS

This invention relates to priming systems for pumps.

In a fuel system for a gas turbine engine, particularly a fuel system which includes centrifugal pumps, it is very desirable that the pumps and feed lines are primed before the engine is started. This may be achieved by further separately driven pumps in the fuel system but there may be occasions when these pumps cannot be run. In this specification by "priming" is meant the removal of air and/or vapour and the like, the term "vapour" used hereinafter being intended to include air alone, a mixture of air and vapour or any other gaseous products or mixtures.

It is an object of the present invention therefore to provide a self priming system for a pump which is suitable for use in a gas turbine engine fuel system.

According to the present invention a priming system for a liquid pump comprises collecting means on the inlet side of the pump for the accumulation of vapour from the liquid, duct means extending from the collecting means to priming pump means adapted to extract the contents of the collecting means via the duct means, the priming pump means being adapted to supply the contents to valve means which is adapted to separate the vapour from the liquid in the contents, and further duct means extending from the valve means to the liquid pump to permit liquid to return thereto.

The collecting means preferably comprises a reservoir located in the liquid pump supply duct.

The priming pump means may comprise an ejector pump which is preferably operated by a liquid supply from the liquid pump, or may comprise a gear pump driven by a motor which is operated by a liquid supply from the liquid pump.

Preferably the valve means comprises a container which is adapted to receive the contents of the collecting means from the primary pump means, and which is provided with means for returning liquid to the further duct means, and means for permitting the escape of vapour from the container.

The container is preferably provided with a valve which is adapted to close off the means for permitting the escape of vapour when the liquid in the container reaches a predetermined level. This valve may conveniently comprise a float valve.

The container may also be provided with a further valve which is adapted to restrict the rate of flow of liquid to the further duct means when the liquid in the container reaches a predetermined level. This further valve is preferably connected to the float valve.

The duct means is preferably provided with a non-return valve and the further duct means may be provided with a shut-off-valve.

When the priming pump means comprises a gear pump, the liquid supply to the motor may be stopped by a shut-off-valve.

Embodiments of the invention will now be described by way of example only with reference to the accompanying drawings in which:

FIG. 1 shows schematically a gas turbine engine fuel system provided with a priming system for a pump according to the present invention, and FIG. 2 illustrates part of the system using different components.

In the FIG. 1 there is shown a gas turbine engine 10 comprising compressor means 12, combustion equipment 14, turbine means 16, a jet pipe 18 and a nozzle 20 arranged in flow series. Fuel is supplied to the combustion equipment 14 from a fuel tank (not shown) along a main fuel supply line 22 which includes low pressure pump 24, coolers and filters 26, a high pressure pump 28, a fuel control unit 30 and a shut-off-cock 32. The fuel system is arranged at a lower level than the engine to prevent drainage of fuel into the combustion equipment 14 when the fuel system is inoperative.

The pumps 24 and 28 are of the centrifugal type, and it is important with this type of pump that substantially no air and/or fuel vapour is present in the pump during starting of the engine. It is also important in the context of the present invention that a substantial quantity of fuel is present in the main fuel supply line 22 and the pumps 24 and 28. Located in the main fuel supply line 22 therefore is a reservoir 34 so positioned that any air and/or fuel vapour present in the line 22 accumulates in the top of the reservoir 34. The reservoir is preferably at a high point in the feed line 22 or it could be replaced by any other suitable device in which the air and/or vapour could accumulate.

The top of the reservoir 34 is connected via a duct 36 and a non-return valve 38 to an ejector pump 40 which is adapted to be powered by a flow of high pressure fuel from downstream of the pump 28 via a duct 42. The ejector pump 40 is connected by another duct 44 to a container 46 which consists of two chambers 48 and 50 mounted one above the other and connected by an opening 66. The top of the chamber 48 is provided with a duct 58 which leads to the fuel drains system of the engine (not shown) or overboard, and the bottom of the chamber 50 communicates with a duct 62 through a restrictor 60, the duct 62 leading back to the bottom of the reservoir 34. The size of the restrictor is such that liquid will not pass through it so rapidly that it carries air and/or vapour with it. Located in the container 46 is a float provided with two valves 52 and 54 connected together by a connecting rod 56. The operation of this float will be described later.

A shut-off-valve 64 is provided in the duct 62 which is adapted to open or close the duct when required although this can be omitted if required.

When the system is inoperative the air and/or vapour accumulates in the reservoir 34 as mentioned previously, the container 46 is empty, the non-return valve 38 is open and the shut-off-valve 64 is open.

When the engine is rotated the pumps 24 and 28 supply fuel along the duct 42 to the ejector pump 40. Since all the air and/or fuel vapour has accumulated in the top of the reservoir 34, liquid fuel only will pass through the pumps 24 and 28. The primary flow of fuel through the ejector pump 40 induces a secondary flow through the duct 36 and the non-return valve 38 to draw the air and/or vapour out of the reservoir 34. The primary and secondary flows mix in the ejector pump 40 and are passed into the container 46 via the duct 44, where the fuel separates from the air and vapour, the fuel passing into the chamber 50 and later the chamber 48 as more fuel enters the container 46. The air and vapour passes out of the chamber 48 through the duct 58 to the drains system. The fuel flows out of the bottom of the container 46 into the duct 62, and back into the bottom of the reservoir 34. Alternatively the fuel could be led into the inlet of the pump 24. As all the air and vapour is drawn out of the reservoir 34, the float in the container 46 rises until the valve 52 closes off the duct 58, i.e. when the flow of liquid fuel out of the container 46 through the restrictor 60 is less than the flow of liquid fuel into the container 46 from the ejector pump 40. The valve 54 also rises, but does not entirely close off the opening 66, thus permitting a small flow therethrough.

With little flow through the ejector pump 40, the static pressure in the pump 40 increases, thus closing the non-return valve 38. If required the shut-off-valve 64 can now be closed to prevent any flow at all through the ejector pump 40 and the container 46. The shut-off-valve 64 could conveniently be operated by the shut-off-cock 32 in the main fuel supply line to the engine: the valve 64 being closed as the shut-off-cock 32 is opened and vice-versa. This would of course mean running the pumps 24 and 28 for a short period of time before the shut-off-cock 32 is opened to permit fuel to flow to the engine. A switch (not shown) could be fitted on the seat of the valve 52 to operate a suitable device to indicate that the air has been removed.

Whilst the invention has been described applied to a fuel system using centrifugal pumps with which priming is particularly desirable, it will be appreciated that the priming system is suitable for any type of pump which requires to be primed.

FIG. 2 illustrates a portion of the system shown in FIG. 1 but with the ejector pump 40 replaced by a gear pump 74. The gear pump 74 is driven by a hydraulic motor 70 through a mechanical connection 77, and the motor 70 is driven by the flow of high pressure fuel from the duct 42. This flow of fuel is shown returning to the low pressure side of the pump 28 through a duct 43, but it could be directed into the duct 44 downstream of the gear pump 74 or into the duct 36 upstream of the gear pump 74 if desired. A shut-off-valve 65 is located in the duct 42 so that the supply of fuel to the motor can be shut-off when the pumps 24 and 28 are primed. The shut-off-valve 65 can be operated in conjunction with the shut-off-cock 32 in the same manner as the shut-off-valve 64.

We claim:

1. A priming system for a liquid pump having an inlet side and an outlet side, said system comprising:

collecting means on the inlet side of the liquid pump having a contents of liquid and vapor, said collecting means accumulating the vapor from the liquid so that only liquid may be supplied to the liquid pump;

priming pump means for extracting said contents from said collecting means;

duct means extending from said collecting means to said priming pump means and through which said contents of said collecting means is extracted;

separating means for receiving said contents from said priming pump and separating the liquid of the same from the vapor;

further duct means extending from said separating means to said liquid pump for permitting liquid from said separating means to return to the liquid pump; and said separating means comprising a container having a first means for returning liquid to said further duct means and a second means for discharing vapor from said container, said first means including a valve initially open to permit return of liquid to the liquid pump and said second means including a second valve initially open to permit discharge of vapor from said container, said second valve being closed when liquid in said container reaches a predetermined level and said first valve being simultaneously operable to restrict the rate of flow of liquid to said further duct means when said liquid in said container reaches the predetermined level.

2. A system as claimed in claim 1 comprising a liquid pump supply duct, said liquid pump supply duct being connected to said inlet side of said liquid pump, and said collecting means comprising a reservoir located in said liquid pump supply duct.

3. A system as claimed in claim 1 wherein said priming pump means comprises an ejector pump, said ejector pump being operated by a liquid supply from said outlet side of said liquid pump.

4. A system as claimed in claim 1 wherein said priming pump means comprises a gear pump and a motor, said motor being operated by a liquid supply from said outlet side of said liquid pump, said motor driving said pump.

5. A system as claimed in claim 4 comprising a shut-off-valve for stopping said liquid supply to said motor.

6. A system as claimed in claim 1 wherein said second valve comprises a float valve.

7. A system as claimed in claim 6 wherein said first valve is connected to said float valve.

8. A system as claimed in claim 1 wherein a non-return valve is provided in said duct means.

9. A system as claimed in claim 1 wherein a shut-off-valve is provided in said further duct means.

10. A system as claimed in claim 1 in which said first means of said separating means is a first chamber for receiving liquid and in which said second means for said separating means is a second chamber for receiving said contents from said priming pump, said second chamber being above said first chamber and in communication with said first chamber.

11. A system as claimed in claim 10 wherein said second valve comprises a float valve in said second chamber and wherein said first valve is in said first chamber and is connected to said float valve.

* * * * *